United States Patent [19]

Yoshioka et al.

[11] Patent Number: 5,144,803
[45] Date of Patent: Sep. 8, 1992

[54] INTERNAL COMBUSTION ENGINE WITH A DUAL TURBOCHARGER SYSTEM

[75] Inventors: Mamoru Yoshioka, Susono; Toshihisa Sugiyama, Gotenba; Toru Kidokoro, Susono, all of Japan

[73] Assignee: Toyota Jidosha Kabushiki Kaisha, Tokyo, Japan

[21] Appl. No.: 643,588

[22] Filed: Jan. 22, 1991

[30] Foreign Application Priority Data

Jan. 22, 1990 [JP] Japan .................................. 2-10536

[51] Int. Cl.⁵ .......................................... F02B 37/12
[52] U.S. Cl. ................................................. 60/612
[58] Field of Search ............................. 60/602, 612

[56] References Cited

U.S. PATENT DOCUMENTS

| | | | |
|---|---|---|---|
| 4,793,140 | 12/1988 | Esch | 60/612 X |
| 4,982,567 | 1/1991 | Hashimoto et al. | 60/612 X |
| 5,003,781 | 4/1991 | Shibata et al. | 60/612 X |
| 5,005,359 | 4/1991 | Tashima et al. | 60/612 X |
| 5,035,114 | 7/1991 | Shibata et al. | 60/612 |

FOREIGN PATENT DOCUMENTS

| | | |
|---|---|---|
| 334228 | 3/1989 | European Pat. Off. . |
| 145328 | 8/1984 | Japan . |
| 112734 | 11/1984 | Japan . |
| 259722 | 12/1985 | Japan . |
| 315614 | 3/1988 | Japan . |

Primary Examiner—Michael Koczo
Attorney, Agent, or Firm—Cushman, Darby & Cushman

[57] ABSTRACT

An internal combustion engine with a dual turbocharger system which includes an engine, a first and a second turbocharger arranged in parallel with each other, an intake switching valve located downstream of a compressor of the second turbocharger, an exhaust switching valve located downstream of a turbine of the second turbocharger, and an exhaust bypass valve installed an exhaust bypass conduit bypassing the exhaust switching valve. The exhaust bypass valve is opened on the basis of a charging pressure at low engine speeds and is opened on the basis of an intake air quantity at high engine speeds. As a result of controlling the exhaust bypass valve in this fashion, a smooth transition from a "one-turbocharger-operation" to a "two-turbocharger-operation" can be obtained throughout the entire range of engine speeds.

11 Claims, 5 Drawing Sheets

FIG. 2

```
                    ┌─────────────────┐
                    │  ENTER ROUTINE  │ 100
                    └────────┬────────┘
                             │
                    ┌────────▼────────┐
                    │  READ INTAKE    │
                    │  AIR QUANTITY   │ 101
                    │      (Q)        │
                    └────────┬────────┘
                             │
   (ONE-TURBOCHARGER-)       │   102
    OPERATION           ╱────▼────╲
              NO      ╱  Q>5,500   ╲
      ┌─────────────◄   ℓ/min       ►
      │               ╲             ╱
      │                ╲───────────╱
      │                     │ YES
      │                     │ (TWO-TURBOCHARGER-
      │                     │  OPERATION)
 INTAKE       ┌──────┐      │       103
 SWITCHING   ◄│VALVE │107   │   ┌─────────┐    INTAKE
 VALVE 18:    │25"OFF│      └──►│ VALVE 26│──► SWITCHING
 CLOSED       └──┬───┘          │  "OFF"  │    VALVE 18:
                 │              └────┬────┘    CLOSED
 EXHAUST      ┌──▼───┐               │  104
 SWITCHING   ◄│VALVE │108       ┌────▼────┐    INTAKE
 VALVE 17:    │28"OFF│          │ VALVE 27│──► BYPASS
 CLOSED       └──┬───┘          │  "ON"   │    VALVE 33:
                 │              └────┬────┘    CLOSED
 INTAKE       ┌──▼───┐       (AFTER)  │
 BYPASS      ◄│VALVE │109    (1 SEC.) │  105
 VALVE 33:    │27"OFF│          ┌────▼────┐    EXHAUST
 OPENED       └──┬───┘          │ VALVE 28│──► SWITCHING
                 │              │  "ON"   │    VALVE 17:
                 │ 110          └────┬────┘    OPENED
         ┌───────▼───────┐   (AFTER)  │
         │ READ INTAKE   │   (0.5SEC.)│  106
         │ PRESSURE (PM) │       ┌────▼────┐    INTAKE
         └───────┬───────┘       │ VALVE 25│──► SWITCHING
                 │               │  "ON"   │    VALVE 18:
  (HIGH LOADS)   │  111          └────┬────┘    OPENED
      NO    ╱────▼────╲               │
     ┌─────◄ PM<-100    ►             │         INTAKE
     │      ╲ MMHg     ╱              │   ═════►SWITCHING
     │       ╲────────╱               │         VALVE 18:
     │          │                     │         OPENED
     │   112    │ YES(LOW LOADS)      │
     │      ┌───▼────┐                │
     │      │VALVE 26│════════════════┤
     │      │  "ON"  │                │
     │      └────────┘                │
     │ 113                            │         INTAKE
   ┌─▼────┐                           │   ═════►SWITCHING
   │VALVE │                           │         VALVE 18:
   │26"OFF│                           │         CLOSED
   └──┬───┘                           │
      │                               │
      └───────────────────────────────┤
                                      │
                              ┌───────▼───────┐
                              │    RETURN     │ 114
                              └───────────────┘
```

INTERNAL COMBUSTION ENGINE WITH A DUAL TURBOCHARGER SYSTEM

BACKGROUND OF THE INVENTION

1. Field of the Invention

The present invention relates to an internal combustion engine with a dual turbocharger system having a first turbocharger and a second turbocharger in which air is charged to the engine by only the first turbocharger at small to medium intake air quantities and is charged by both the first and the second turbochargers at large intake air quantities.

2. Description of the Prior Art

As illustrated in FIG. 6 (Prior Art), a conventional turbocharged internal combustion engine 1' is provided with a first turbocharger 7' and a second turbocharger 8' having turbines 7a' and 8a', respectively, and compressors 7b' and 8b', respectively. An exhaust switching valve 17' is installed in an exhaust conduit 20b' positioned downstream of the turbine 8a'. Similarly, an intake switching valve 18' is installed in an intake conduit 14b' positioned downstream of the compressor 8b'. Further, an intake bypass valve 33' is installed in an intake bypass conduit 13' bypassing the compressor 8b'. The intake switching valve 18' and the exhaust switching valve 17' are closed at small to medium intake air quantities to produce "one-turbocharger-operation" wherein only the first turbocharger 7' is operated. The intake switching valve 18' and the exhaust switching valve 17' are opened at large intake air quantities to produce "two-turbocharger-operation" wherein both the first turbocharger 7' and the second turbocharger 8' are operated. A smooth transition from a "one-turbocharger-operation" to a "two-turbocharger-operation" is obtained by partially opening the exhaust switching valve 17' to run-up the second turbocharger 7'.

Japanese Patent Publication SHO 59-145328 teaches partially opening the exhaust switching valve 17' at an intake air quantity smaller than a switching intake air quantity at which a "one-turbocharger-operation" is changed to "two-turbocharger-operation". Also, Japanese Patent Publication SHO 61-112734 teaches partially opening the exhaust switching valve 17' at a charging pressure lower than a switching charging pressure at which a "one-turbocharger-operation" is changed to a "two-turbocharger-operation".

However, partially opening the exhaust switching valve as described above can degrade system performance. More particularly, in the case where the partial opening of the exhaust switching valve 17' is controlled on the basis of an intake air quantity, the charging pressure will not reach the desired charging pressure due to a time lag in turbocharger operation and therefore, the transition from a "one-turbocharger-operation" to a "two-turbocharger-operation" is accompanied by a decrease in torque at low engine speeds. In contrast, in the case where partial opening of the exhaust switching valve 17' is controlled on the basis of a charging pressure, the turbocharger operation is changed from a "one-turbocharger-operation" to a "two-turbocharger-operation" without experiencing the step of partially opening the exhaust switching valve 17' and therefore, the transition is accompanied by a relatively large torque shock.

SUMMARY OF THE INVENTION

One object of the present invention is to provide an internal combustion engine having a dual turbocharger system capable of a smooth transition from a "one-turbocharger-operation" to a "two-turbocharger-operation".

The above-described object can be attained by the internal combustion engine of the present invention by providing a multi-cylinder internal combustion engine with an air intake and an exhaust outlet, a first turbocharger and a second turbocharger arranged in parallel with each other with respect to the engine and each including a turbine and a compressor driven by the turbine, an intake switching valve installed downstream of the second turbocharger compressor, an exhaust switching valve installed downstream of the second turbocharger turbine, an exhaust bypass conduit bypassing the exhaust switching valve, and an exhaust bypass valve installed in the exhaust bypass conduit. The opening and the closing of the exhaust bypass valve is determined on the basis of a charging pressure when the engine speed is equal to or lower than a predetermined engine speed and is determined on the basis of an intake air quantity when the engine speed is higher than the predetermined engine speed.

In the above-described internal combustion engine with a dual turbocharger system, at low engine speed, only after the charging pressure reaches the predetermined charging pressure is the turbocharger operation changed from a "one-turbocharger-operation" to a "two-turbocharger-operation" such that no torque decrease occurs. Further, only after the intake air quantity reaches the predetermined intake air quantity and the second turbocharger is run-up is the turbocharger operation changed from a "one-turbocharger-operation" to a "two-turbocharger-operation" such that a torque shock is prevented.

BRIEF DESCRIPTION OF THE DRAWINGS

The above described object and other objects, features, and advantages of the present invention will become more apparent and will be more readily appreciated from the following detailed description of the preferred embodiments of the invention taken in conjunction with the accompanying drawings, in which:

FIG. 2 is a flow chart illustrating an operation control of the internal combustion engine with a dual turbocharger system in accordance with the embodiment of FIG. 1;

DETAILED DESCRIPION OF THE PREFERRED EMBODIMENT

Figure 3:
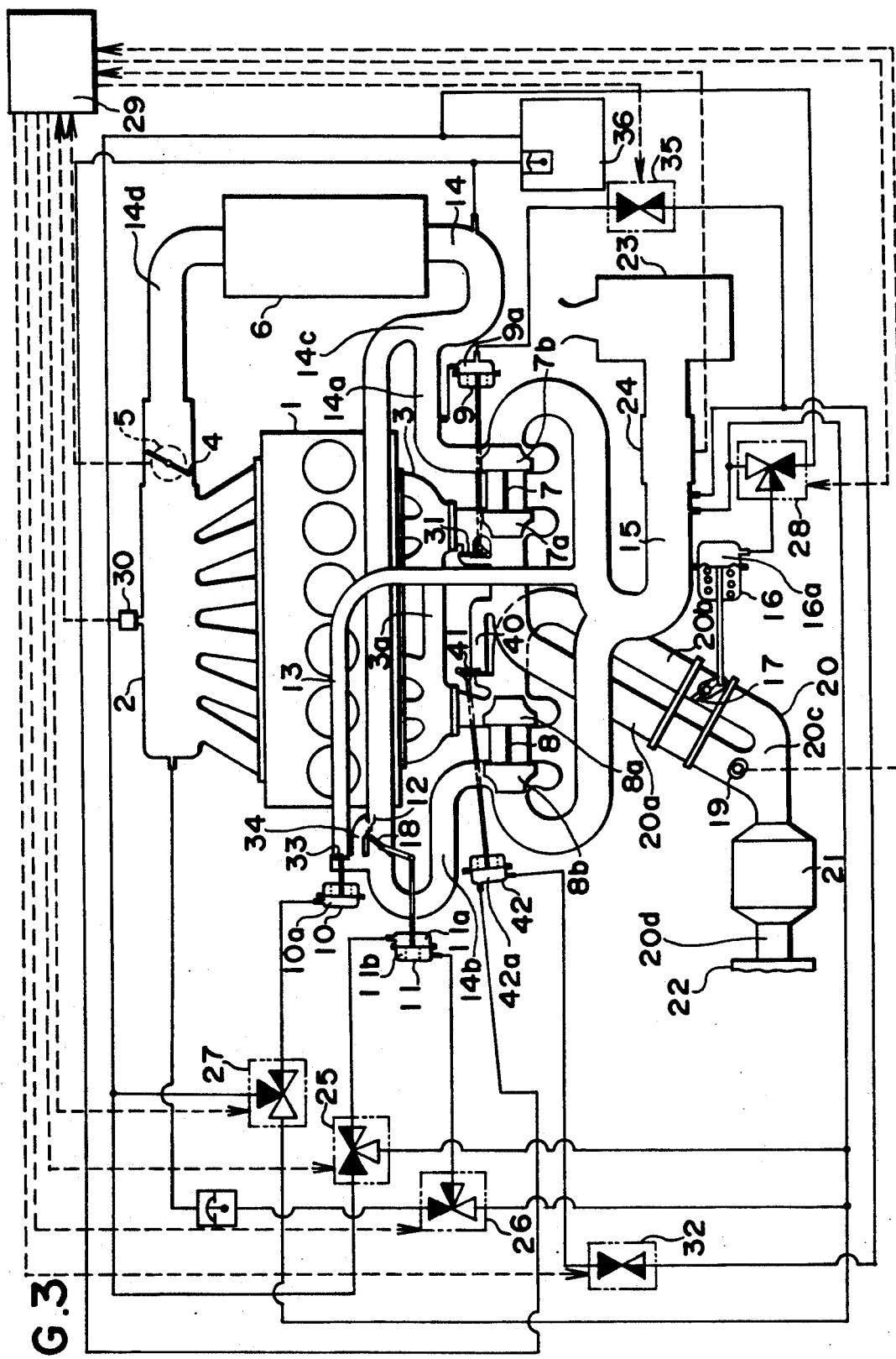
FIG. 3 is a schematic view of the internal combustion engine with a dual turbocharger system in accordance with the embodiment of FIG. 1.

As illustrated in FIG. 3, an internal combustion engine with a dual turbocharger system in accordance with one embodiment of the present invention includes a multi-cylinder engine, for example, a six-cylinder internal combustion engine 1 with an air intake and an exhaust outlet. The cylinders of the engine 1 are grouped into two groups. An exhaust manifold 3 is connected with the engine exhaust outlets and includes a first portion connected with a first group of engine cylinders and a second portion connected with a second group of engine cylinders. The first and second portions of the exhaust manifold 3 communicate with each other via a connecting conduit 3a.

A first turbocharger 7 and a second turbocharger 8 are provided so as to be in parallel with each other with respect to the engine 1. The first turbocharger 7 is operated throughout all intake air quantities, and the second turbocharger 8 is operated only at large intake air quantities. The first turbocharger 7 includes a turbine 7a and a compressor 7b driven by the turbine 7a. Similarly, the second turbocharger 8 includes a turbine 8a and a compressor 8b driven by the turbine 8a. The turbine 7a is connected with the first portion of the exhaust manifold 3 and the turbine 8a is connected with the second portion of the exhaust manifold 3. As a result, the first and second turbines 7a and 8a are connected with the engine exhaust outlet via the exhaust manifold 3. On the other hand, the compressor 7b and the compressor 8b are connected with the air intake of the engine 1 via an intake line.

The intake line connected with the engine air intake includes a first intake passage 15 positioned upstream of the compressors 7b and 8b and a second intake passage 14 positioned downstream of the compressors 7b and 8b. Further, the second intake passage 14 includes a first intake conduit 14a located downstream of and connected with the compressor 7b, a second intake conduit 14b located downstream of and connected with the compressor 8b, a connecting portion 14c, where the first intake conduit 14a and the second intake conduit 14b join each other, and a common intake conduit 14d connecting the connecting portion 14c with the engine air intake. In the first intake passage 15, an air cleaner 23 and an air flow meter 24 are installed in that order in an intake air flow direction. An intercooler 6, a throttle valve 4, and a surge tank 2 are also installed, in the intake air flow direction, respectively, in the common intake conduit 14d.

An exhaust line 20, connected to the engine exhaust outlets, includes a first exhaust conduit 20a connected to the first portion of the exhaust manifold 3, in which the turbine 7a is installed, a second exhaust conduit 20b connected to the second portion of the exhaust manifold 3, in which the turbine 8a is installed, a connecting portion 20c where the first exhaust conduit 20a and the second exhaust conduit 20b join each other, and an exhaust pipe 20d located downstream of and connected to the connecting portion 20c. In the exhaust pipe 20d, a catalytic converter 21 and an exhaust muffler 22 are installed in an exhaust gas flow direction, respectively. Further, at the connecting portion 20c or in the vicinity of the connecting portion 20c, an oxygen sensor 19 is installed.

For the purpose of switching the operation from a "one-turbocharger-operation," in which only the first turbocharger 7 is operated at small to medium intake air quantities, and a "two-turbocharger-operation," in which both the first turbocharger 7 and the second turbocharger 8 are operated at large intake air quantities, an exhaust switching valve 17 is installed in the second exhaust conduit 20b downstream of the turbine 8a, and an intake switching valve 18 is installed in the second intake conduit 14b downstream of the compressor 8b. When both the exhaust switching valve 17 and the intake switching valve 18 are closed, the operation of the second turbocharger 8 is stopped and only the first turbocharger 7 is in operation. In contrast, when both the exhaust switching valve 17 and the intake switching valve 18 are opened, both the first turbocharger 7 and the second turbocharger 8 are in operation.

For the purpose of minimizing the shock which typically accompanies the transition from a "one-turbocharger-operation" to a "two-turbocharger-operation", the second turbocharger 18 should be run-up before it is fully rotated. In the conventional turbocharged engine, this running-up of the second turbocharger 8 is achieved by partially opening the exhaust switching valve. In the present invention, however, an exhaust bypass conduit 40 is provided bypassing the exhaust switching valve 17, and the running-up of the second turbocharger 8 is achieved by opening an exhaust bypass valve 41 installed in the exhaust bypass conduit 40. More particularly, when the exhaust bypass valve 41 is opened, a relatively small amount of exhaust gas flows through the exhaust bypass conduit 40 such that the second turbocharger 8 can be run-up. When the exhaust switching valve 17 is opened, the rotational speed of the second turbocharger 8 is increased from a run-up rotational speed and not from a standstill whereby the transition shock is effectively suppressed. When the second turbocharger 8 is preliminarily rotated and the intake switching valve 18 is closed, a portion of the pressurized air located in the second intake conduit 14b between the compressor 8b and the intake switching valve 18, will leak through the compressor 8b and flow to a portion of the intake conduit upstream of the compressor 8b. Following which, this same air will then again be driven by the compressor 8b and compressed into the portion of the intake conduit downstream of the compressor 8b. This leakage and re-pressurization of the intake repeats continually and undesirably increases the temperature of the intake air and thus, the temperature of the impeller of the compressor 8b itself. To prevent this compressed air from such temperature increases, an intake bypass conduit 13 is provided to bypass the compressor 8b of the second turbocharger 8. More particularly, the intake bypass conduit 13 connects the portion of the second intake conduit 14b positioned between the compressor 8b and the intake switching valve 18 with the first intake passage 15 upstream of the compressors 7b and 8b. An intake bypass valve 33 is installed in, and is adapted to open and close, the intake bypass conduit 13. When the second turbocharger 8 is preliminarily rotated, the intake bypass valve 33 is opened to minimize the intake air temperature increase.

An intake switching valve bypass conduit 34 may be provided to connect a portion of the second intake conduit 14b positioned upstream of the intake switching valve 18 with a portion of the intake conduit 14b positioned downstream of the intake switching valve 18 to bypass the intake switching valve 18. A check valve 12 is installed in the intake switching valve bypass conduit 34. The check valve 12 permits the intake air to flow in the direction from the portion of the second intake conduit 14b positioned upstream of the intake switching valve 18 toward the portion of the second intake conduit 14b positioned downstream of the intake switching valve 18. As a result, when the intake switching valve 18 is closed and the compressor outlet pressure of the second turbocharger 8 grows to exceed a compressor outlet pressure of the first turbocharger 7, the check valve 12 opens the bypass conduit 34 and permits the intake air to flow through the check valve 12. Further, the turbine 7a is provided with a waste gate valve 31. A positive pressure tank 36 is also provided so as to be connected with a portion of the common intake conduit 14d upstream of the intercooler 6 and to hold a charging pressure therein.

Various actuators are provided to operate the above-described valves. More particularly, the waste gate valve 31 is operated by an actuator 9, the intake bypass valve 33 is operated by an actuator 10, the intake switching valve 18 is operated by an actuator 11, the exhaust switching valve 17 is operated by an actuator 16, and the exhaust bypass valve 41 is operated by the actuator 42. Each of these actuators comprises a single diaphragm-type actuator.

Various three-way or two-way solenoid valves 25, 26, 27, 28, 32 and 35 are provided to switch on and off the actuators 9, 10, 11, 16, and 42. These solenoid valves 25, 26, 27, 28, 32 and 35 operate according to the instructions from an engine control computer 29. In this instance, either one of "ON" of the three-way solenoid valve 25 or "ON" of the three-way valve 26 actuates the actuator 11 to open the intake switching valve 18, and either one of "OFF" of the three-way solenoid valve 25 or "OFF" of the three-way solenoid valve 26 actuates the actuator 11 to close the intake switching valve 18. More particularly, the intake air switching valve operating means includes the diaphragm actuator 11, the three-way solenoid valve 25, and the three-way solenoid valve 26. The diaphragm actuator 11 includes a diaphragm operatively coupled to the intake switching valve 18, a first chamber 11a on one side of the diaphragm, and a second chamber 11b on another side of the diaphragm. The solenoid valve 25 is connected to the first chamber 11a and is adapted to switch between conducting a positive pressure from the positive pressure tank 36 into the first chamber 11a at large intake air quantities to open the intake switching valve 18 and conducting an atmospheric pressure into the first chamber 11a at small to medium intake air quantities to close the intake switching valve 18. The three-way solenoid valve 26 is connected to the second chamber 11b and is adapted to switch between conducting an atmospheric pressure into the second chamber 11b at high engine loads to close the intake switching valve 18 and conducting a negative pressure from the surge tank 2 into the second chamber 11b at low engine loads to open the intake switching valve 18 despite the small to medium intake air quantities.

Similarly, "ON" of the three-way solenoid valve 28 actuates the actuator 16 to open the exhaust switching valve 17, and "OFF" of the three-way solenoid valve 28 actuates the actuator 16 to close the exhaust switching valve 17. "ON" of the three-way solenoid valve 27 actuates the actuator 10 to close the intake bypass valve 33, and "OFF" of the three-way solenoid valve 27 actuates the actuator 10 to open the intake bypass valve 33. "ON" of the two-way solenoid valve 32 which may comprise a duty control valve actuates the actuator 42 to open the exhaust bypass valve 41, and "OFF" of the two-way solenoid valve 32 actuates the actuator 42 to close the exhaust bypass valve 41. Further, the actuator 16 includes a diaphragm chamber 16a, the actuator 10 includes a diaphragm chamber 10a, the actuator 11 includes diaphragm chambers 11a and 11b, the actuator 42 includes a diaphragm chamber 42a, and the actuator 9 includes a diaphragm chamber 9a.

Various sensors for sensing the engine operating conditions are provided and the outputs of the sensors are fed to the engine control computer 29. More particularly, the various sensors include an intake pressure sensor 30, a throttle opening degree detecting sensor 5, an intake air quantity detecting sensor such as an air flow meter 24, the aforementioned oxygen sensor 19, an engine speed sensor or crank angle sensor (not shown), and a vehicle speed sensor (not shown).

Figure 1:
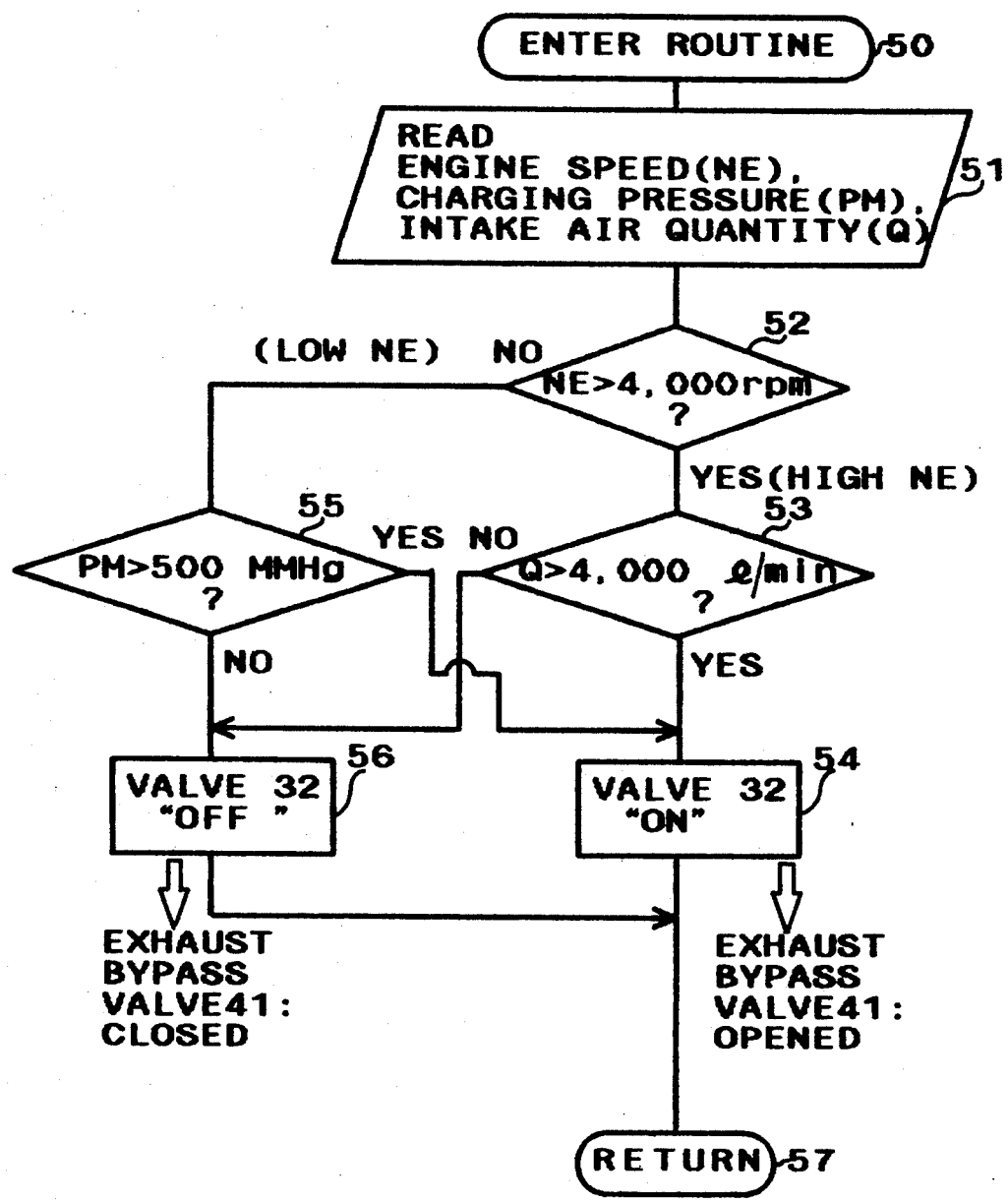
FIG. 1 is a flow chart illustrating an operation control of an exhaust bypass valve of an internal combustion engine with a dual turbocharger system in accordance with one embodiment of the present invention.

The engine control computer 29 includes a central processor unit (CPU), a read-only memory (ROM), a random access memory (RAM), an input and output interface (I/O interface), and an analogue/digital convertor (A/D convertor) like a usual micro computer. FIGS. 1 and 2 illustrate a program according to which the turbocharged internal combustion engine is operated. The programs of FIGS. 1 and 2 are stored in the ROM and are fed into the CPU where the routines are executed to operate the above-described valves and actuators.

Control structures and operation of the turbocharged engine will now be explained with reference to FIGS. 1 and 2. The routine of FIG. 1 is entered at step 50. Then, at step 51, the current engine speed NE which is an output signal of the engine speed sensor, the current intake air quantity Q, which is an output signal of the air flow meter 24, and the current charging pressure, which is an output signal of the intake pressure sensor 30, are read, respectively. Then, the routine proceeds to a step 52, where whether or not the current engine speed NE is higher than a predetermined engine speed, for example 4,000 rpm, is determined. In this instance, the step 52 constitutes engine speed determining means.

When the engine speed is determined by the engine speed determining means to be equal to or lower than the predetermined engine speed at step 52, the routine proceeds to a step 55, where whether or not the current intake pressure PM is higher than a predetermined charging pressure, for example 500 mm Hg, is determined. In this instance, the step 55 constitutes charging pressure determining means. When the charging pressure PM is determined by the charging pressure determining means to be higher than the predetermined charging pressure at step 55, the routine proceeds to a step 54, where the solenoid valve 32 is switched to "ON" so that the exhaust bypass valve 41 is opened and the second turbocharger 8 begins to be run-up. When the charging pressure PM is determined to be equal to or lower than the predetermined charging pressure at step 55, the routine proceeds to a step 56, where the solenoid valve 32 is switched to "OFF" so that the exhaust bypass valve 41 is closed.

When the engine speed is determined by the engine speed determining means to be higher than the predetermined engine speed at step 52, the routine proceeds to a step 53, where whether or not the current intake air quantity Q is larger than a predetermined intake air quantity, for example 4,000 l/min, is determined. In this instance, the step 53 constitutes intake air quantity determining means. When the intake air quantity Q is determined to be larger than the predetermined intake air quantity at step 53, the routine proceeds to a step 54 and the exhaust bypass valve 41 is opened. When the intake air quantity Q is determined to be equal to or smaller than the predetermined intake air quantity at step 53, the routine proceeds to step 56 and the exhaust bypass valve 41 is closed. The step 54 and the step 56 constitute exhaust bypass valve operating means. From the exhaust bypass valve operating means, the routine proceeds to a returning step 57.

The routine of FIG. 2 is entered at step 100. Then, at step 101, the current intake air quantity which is an output signal from the air flow meter 24 is read. Then, at step 102, it is determined whether or not the intake air quantity Q is larger than a predetermined quantity, for example, 5,500 l/min, that is, whether or not the current engine operational condition is a condition to be operated under "two-turbocharger-operation". More particularly, when Q is larger than 5,500 l/min, the current condition is deemed to be a condition causing a "two-turbocharger-operation". In contrast, when Q is equal to or less than 5,500 l/min, the current condition is deemed to be a condition causing a "one-turbocharger-operation". However, since there is a time lag for the charging pressure to reach 500 mm Hg after the valves 17 and 18 are switched, switching of the valves 17 and 18 should be executed at 5,500 l/min rather than at 6,000 l/min. as shown in step 102 of FIG. 5.

When the current engine operational condition is determined to be a condition causing a "two-turbocharger-operation" at step 102, the routine proceeds to a step 103. At step 103, in a case where the intake switching valve 18 is at a partially opened state, the three-way solenoid valve 26 is switched to "OFF" to close the intake switching valve 18. Then, at step 104, the three-way solenoid valve 27 is switched to "ON" to introduce the intake pressure at a portion of the intake conduit downstream of the compressor (the charging pressure) into the diaphragm chamber 10a of the actuator 10 to thereby close the intake bypass valve 33.

Then, the routine further proceeds to a step 105. At step 105, after declaring a short period of time necessary to run-up the second turbocharger 8, for example, one second after the switching-on of the three-way solenoid valve 27, the three-way solenoid valve 28 is switched to "ON" to introduce the charging pressure into the diaphragm chamber 16a of the actuator 16 to thereby open the exhaust switching valve 17. If the compressor outlet pressure of the second turbocharger 8 grows greater than the compressor outlet pressure of the first turbocharger 7, the charging air pressurized by the second turbocharger 8 passes through the check valve 12 and is supplied to the engine 1. Then, at step 106, after a short period of time, for example, 0.5 seconds after the switching-on of the three-way solenoid valve 28, the three-way solenoid valve 25 is switched to "ON" to introduce the charging pressure into the diaphragm chamber 11a of the actuator 11 to thereby open the intake switching valve 18. In this state, both the first turbocharger 7 and the second turbocharger 8 are in operation. Then, the routine proceeds to a step 114 and returns.

When the engine operational condition is determined to be a "one-turbocharger-operation" condition at the aforementioned step 102, the routine proceeds to a step 107. At step 107, the three-way valve 25 is switched to "OFF" to close the intake switching valve 18. Then, at step 108, the three-way solenoid valve 28 is switched to "OFF" to close the exhaust switching valve 17. Then, at step 109, the three-way solenoid valve 27 is switched to "OFF" to open the intake bypass valve 33. By these steps 107, 108 and 109, the "one-turbocharger-operation" is produced. In this state, even if the second turbocharger 8 is rotated by the engine exhaust pressure, the air pressurized by the compressor 8b returns to the first intake passage 15 through the intake bypass conduit 13.

Then, the routine proceeds to a step 110 where the intake gas pressure PM is read. Then, the routine proceeds to a step 111 where it is determined whether or not the engine load is low, for example, whether or not the intake pressure PM is smaller than −100 mm Hg. If the intake pressure PM is equal to or larger than −100 mm Hg and, therefore, the engine load is high, the routine proceeds to a step 113 where the three-way solenoid valve 26 is switched to "OFF" to close the intake switching valve 18. In this state, since the intake switching valve 18 is closed and the exhaust switching valve 17 is closed, the turbocharged system operates according to the "one-turbocharger-operation" and a good torque response is obtained.

When PM is smaller than −100 mm Hg and, therefore, the engine load is determined to be low at step 111, the routine proceeds to a step 112. At step 112, the three-way solenoid valve 26 is switched to "ON" to introduce the negative pressure at the surge tank 2 into a diaphragm chamber 11b of the actuator 11 to thereby open the intake switching valve 18. In this state, since the exhaust switching valve 17 is closed, the second turbocharger 8 is not driven and only the first turbocharger 7 is in operation. However, since the intake switching valve 18 is opened, the intake air can be sucked through both the first intake conduit 14a and the second intake conduit 14b. As a result, a great amount of intake air can be supplied to the engine 1 and the acceleration characteristic from a low engine load is improved. Then, the routine proceeds to a step 114 and returns.

Figure 4:
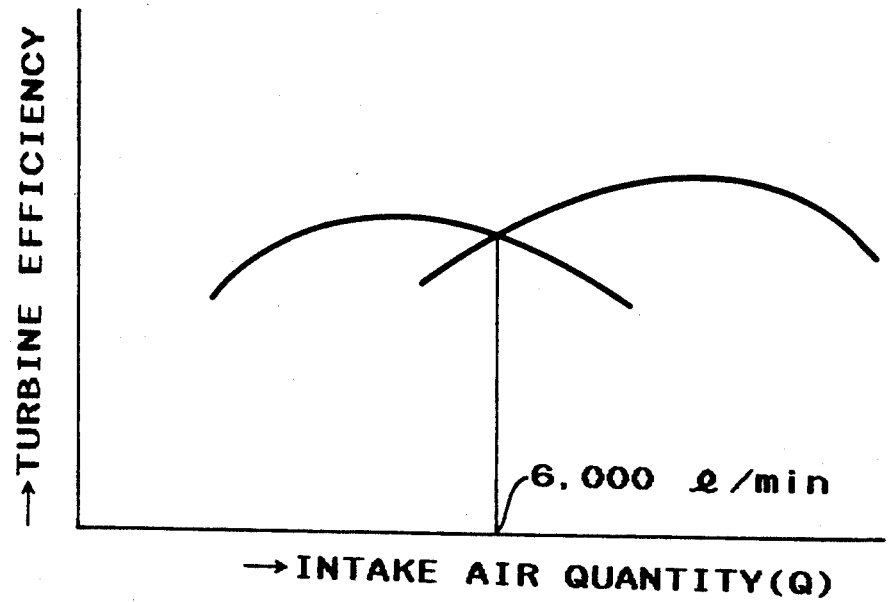
FIG. 4 is a graphical representation of a turbine efficiency versus an intake air quantity map of the internal combustion engine with a dual turbocharger system of the embodiment of FIG. 1.
Figure 5:
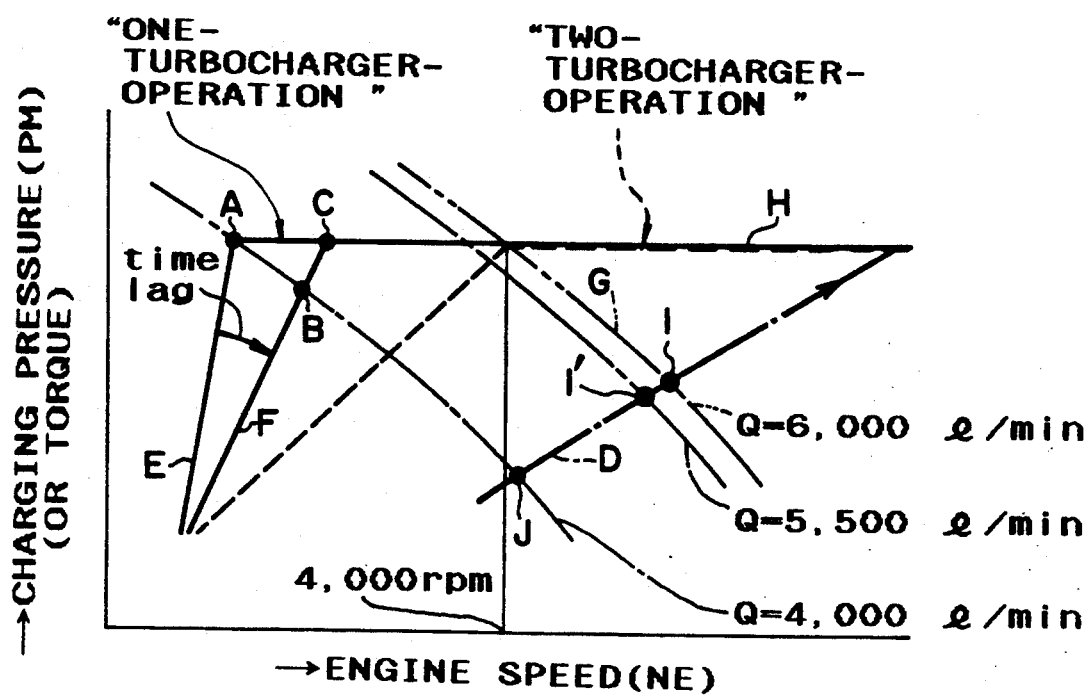
FIG. 5 is a graphical representation of a charging pressure versus an intake air quantity map of the internal combustion engine with a dual turbocharger system of the embodiment of FIG. 1.
Figure 6:
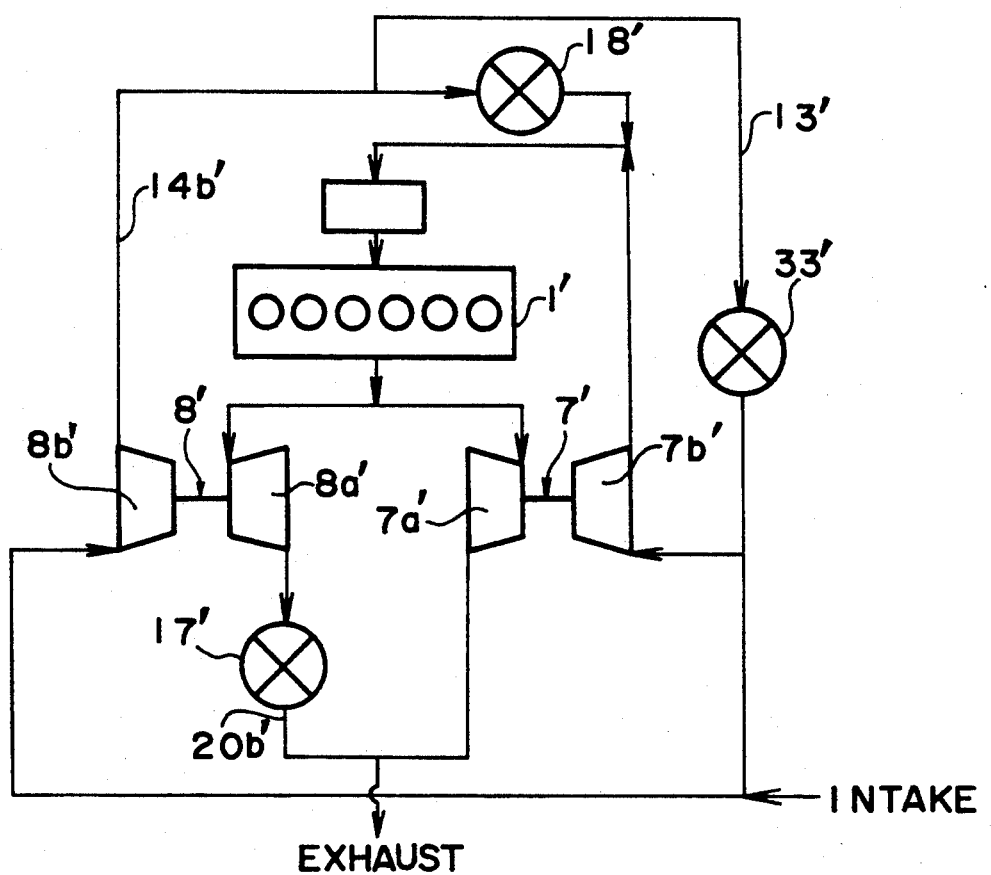
FIG. 6 (PRIOR ART) is a system diagram of a conventional dual turbocharger system.

FIGS. 4 and 5 illustrate operational features of the invention. Since the "one-turbocharger-operation" has a better turbine efficiency than the "two-turbocharger-operation" at small to medium intake air quantities, for example at intake air quantities below 6,000 rpm, the operation of the second turbocharger 8 is stopped at the small to medium intake air quantities and is operated only at large intake air quantities. However, as discussed in the foregoing, since there is a time lag in the turbocharger operation, the operation changing action is taken at about 5,500 l/min (see step 102 of FIG. 2).

For the purpose of suppressing a torque shock at the transition from "one-turbocharger-operation" to "two-turbocharger-operation", the second turbocharger 8 is run-up by opening the exhaust bypass valve 41 before the changing of the turbine operation from "one-turbocharger-operation" to "two-turbocharger-operation".

In this instance, if the opening condition of the exhaust bypass valve 41 were controlled only on the basis of an intake air quantity, a decrease in torque would take place at the transition from the "one-turbocharger-operation" to the "two-turbocharger-operation". More particularly, as illustrated in FIG. 5, when the exhaust bypass valve 41 is set to open, for example at 4,000 l/min, the exhaust bypass valve opening point shifts from point A to point B due to a turbocharger time lag, because an NE-PM line changes from line E to line F when the engine speed increases. As a result, the exhaust bypass valve 41 would open at a charging pressure (point B) lower than 500 mm Hg (point C). Once the exhaust bypass valve 41 is opened at point B, the charging pressure would not increase to 500 mm Hg because one portion of the intake air flows to the second turbocharger 8 and therefore the first turbocharger 7 is not fully driven. Therefore, the engine operation is changed from the "one-turbocharger-operation" to the "two-turbocharger-operation" at a charging pressure lower than 500 mm Hg, and a decrease in torque occurs during the transition.

On the other hand, if the opening condition of the exhaust bypass valve 41 were controlled only on the basis of a charging pressure, that is, if the exhaust bypass valve 41 were opened only after the charging pressure reached 500 mm Hg, the exhaust bypass valve 41 would not open at high engine speeds until after the turbine operation changes from the "one-turbocharger-operation" to the "two-turbocharger-operation". This change would be accompanied by a relatively great torque shock. More particularly, in FIG. 5, when the charging pressure versus engine speed characteristic increases along line D at high engine speeds, the characteristic crosses the intake air quantity line G of 6,000 l/min before it reaches the charging pressure line H of 500 mm Hg. Therefore, before the charging pressure can reach 500 mm Hg, the engine operation is changed from the "one-turbocharger-operation" to "two-turbocharger-operation" at I which point is an intersection of lines D and G. The actual valve switching operation should be done at I'; the intersection of line D and the 5,500 l/min line, thus taking the time lag into consideration. This means that a step of running-up the second turbocharger 8 is skipped.

However, in the present invention, since the opening of the exhaust bypass valve 41 is determined on the basis of a charging pressure at engine speeds equal to or lower than the predetermined engine speed, for example 4,000 rpm, and is determined on the basis of an intake air quantity at engine speeds higher than the predetermined engine speed, the above-described problems are solved. More particularly, at relatively low engine speeds, the charging pressure versus engine speed characteristic changes along line F and the engine operation is changed from the "one-turbocharger-operation" to the "two-turbocharger-operation" at point C (not at point B). As a result, the charging pressure can rise up to 500 mm Hg, and no decrease in torque occurs during the transition. On the other hand, at relatively high engine speeds, the charging pressure versus engine speed characteristic changes along line D and the exhaust bypass valve 41 is opened at point J which is the intersection of line D and the 4,000 l/min line, to begin to run-up the second turbocharger 8 before the engine operation is changed from the "one-turbocharger-operation" to the "two-turbocharger-operation" at point I.

In accordance with the present invention, the following advantages are obtained.

First, because the condition for opening of the exhaust bypass valve 41 is determined on the basis of a charging pressure at relatively low engine speeds, a torque decrease is prevented from occurring during the "one-turbocharger-operation" to "two-turbocharger-operation" transition.

Second, because the condition for opening of the exhaust bypass valve 41 is determined on the basis of a charging pressure at relatively high engine speeds, skipping the step of running-up of the second turbocharger 8 is avoided during transition from the "one-turbocharger-operation" to the "two-turbocharger-operation" and a smooth transition can occur.

Therefore, a smooth transition of the turbocharger operation from the "one-turbocharger-operation" to the "two-turbocharger-operation" can be obtained throughout the entire range of engine speeds.

Although only one embodiment of the invention has been described in detail above, it will be appreciated by those skilled in the art that various modifications and alterations can be made to the particular embodiment shown without materially departing from the novel teachings and advantages of the present invention. Accordingly, it is to be understood that all such modifications and alterations are included within the spirit and scope of the present invention as defined by the following claims.

What is claimed is:

1. An internal combustion engine with a dual turbocharger system comprising:

a multi-cylinder internal combustion engine having an air intake and an exhaust outlet;

a first and a second turbocharger arranged in parallel with each other with respect to the engine, each including a turbine and a turbine driven compressor, the turbines being connected with the exhaust outlet of the engine and the compressors being connected with the air intake of the engine;

an intake switching valve installed downstream of the second turbocharger compressor and an exhaust switching valve installed downstream of the second turbocharger turbine;

an exhaust bypass conduit bypassing the exhaust switching valve and an exhaust bypass valve installed in the exhaust bypass conduit;

means for measuring an engine speed;

means for measuring a charging pressure;

means for measuring an intake air quantity;

means for closing the intake switching valve and the exhaust switching valve whenever the intake air quantity is below a first predetermined intake air quantity whereby only the first turbocharger is in operation and for opening the intake switching valve and the exhaust switching valve whenever the intake air quantity is above a first predetermined intake air quantity whereby the first and second turbochargers are in operation;

valve operating means for selectively opening and closing the exhaust bypass valve; and decision means operatively connected with the engine speed measuring means, the charging pressure measuring means, the intake air quantity measuring means and the exhaust bypass valve and serving to open and close the exhaust bypass valve on the basis of charging pressure whenever the engine speed is equal to or less than a predetermined engine speed and on the basis of intake air quantity at engine speeds higher than the predetermined engine speed.

2. An internal combustion engine with a dual turbocharger system according to claim 1 wherein, the decision means serves to open the exhaust bypass valve whenever the engine speed is equal to or less than the predetermined engine speed and the charging pressure is greater than a first predetermined charging pressure and whenever the engine speed is greater than the predetermined engine speed and the intake air quantity is greater than a second predetermined intake air quantity smaller than the first predetermined intake air quality and servinv to close the exhaust bypass valve whenever the engine speed is equal to or less than the predetermined engine speed and the charging pressure is equal to or less than the predetermined charging pressure and whenever the engine speed is greater than the predetermined engine speed and the intake air quantity is equal to or less than the second predetermined intake air quantity.

3. An internal combustion engine with a dual turbocharger system according to claim 2, wherein the predetermined engine speed is substantially 4,000 rpm.

4. An internal combustion engine with a dual turbocharger system according to claim 2, wherein the first predetermined charging pressure is substantially 500 mm Hg.

5. An internal combustion engine with a dual turbocharger system according to claim 2, wherein the second predetermined intake air quantity is 4,000 l/min.

6. An internal combustion engine with a dual turbocharger system comprising:
- a multi-cylinder internal combustion engine with an air intake and at least one exhaust outlet, wherein the engine includes a first and a second group of cylinders;
- an exhaust manifold connected with the engine exhaust outlet, the exhaust manifold including a first portion connected to the first group of the cylinders and a second portion connected to the second group of the cylinders, the first portion and the second portion of the exhaust manifold communicating with each other by a connecting conduit;
- a first and a second turbocharger arranged in parallel with each other with respect to the engine, each including a turbine and a turbine driven compressor, the turbines being connected with the engine exhaust outlet of the engine by the exhaust manifold with the compressors being connected with the air intake of the engine;
- an intake line including a first intake conduit connected with the first turbocharger compressor, a second intake conduit connected with the second turbocharger compressor, an intake connecting portion joining the first intake conduit and the second intake conduit, and an intake common conduit connecting the intake connecting portion and the air intake of the engine;
- an exhaust line including a first exhaust conduit connected with the first portion of the exhaust manifold, in which the first turbocharger turbine is installed, a second exhaust conduit connected with the second portion of the exhaust manifold, in which the second turbocharger turbine is installed, an exhaust connecting portion where the first exhaust conduit and the second exhaust conduit join each other, and an exhaust pipe located downstream of and connected with the exhaust connecting portion;
- an intake switching valve installed downstream of the second turbocharger compressor in the second intake conduit and adapted to open and close the second intake conduit;
- an exhaust switching valve installed downstream of the second turbocharger turbine in the second exhaust conduit and adapted to open and close the second exhaust conduit;
- an exhaust bypass conduit connecting a portion of the second exhaust conduit downstream of the second turbocharger turbine and upstream of the exhaust switching valve with a portion of the second exhaust conduit downstream of the exhaust switching valve;
- an exhaust bypass valve installed in the exhaust bypass conduit and adapted to open and close the exhaust bypass conduit;
- means for measuring an engine speed;
- means for measuring a charging pressure;
- means for measuring an intake air quantity;
- means for opening the intake switching valve whenever the intake air quantity is greater than a first predetermined intake air quantity and whenever the intake air quantity is equal to or less than the first predetermined intake air quantity and the charging pressure is less than a second predetermined charging pressure, and for closing the intake switching valve whenever the intake air quantity is equal to or less than the first predetermined intake air quantity and the charging pressure is greater than the second predetermined charging pressure;
- means for opening the exhaust switching valve whenever the intake air quantity is greater than the first predetermined intake air quantity and for closing the exhaust switching valve whenever the intake air quantity is equal to or less than the first predetermined intake air quantity; and
- means for opening the exhaust bypass valve whenever the engine speed is equal to or less than a predetermined engine speed and the charging pressure is greater than a first predetermined charging pressure and whenever the engine speed is greater than the predetermined engine speed and the intake air quantity is greater than a second predetermined intake air quantity and serving to close the exhaust bypass valve whenever the engine speed is equal to or less than the predetermined engine speed and the charging pressure is equal to or less than the first predetermined charging pressure and whenever the engine speed is greater than the predetermined engine speed and the intake air quantity is equal to or less than the second predetermined intake air quantity.

7. An internal combustion engine with a dual turbocharger system according to claim 6, wherein the exhaust bypass conduit connects a portion of the second exhaust conduit downstream of the second turbocharger turbine and upstream of the exhaust switching valve with the exhaust connecting portion joining the first and second exhaust conduits.

8. An internal combustion engine with a dual turbocharger system according to claim 6, wherein the exhaust bypass conduit connects a portion of the second exhaust conduit downstream of the second turbocharger turbine and upstream of the exhaust switching valve with a portion of the first exhaust conduit downstream of the first turbocharger turbine.

9. An internal combustion engine with a dual turbocharger system according to claim 6, wherein the first predetermined intake air quantity is substantially 5,500 l/min, the second predetermined intake air quantity is substantially 4,000 l/min, the first predetermined charging pressure is substantially 500 mm Hg, the second predetermined charging pressure is substantially $-100$ mm Hg, and the predetermined engine speed is substantially 4,000 rpm.

10. An internal combustion engine with a dual turbocharger system according to claim 6, and further comprising:

an intake bypass conduit connecting a portion of the second intake conduit downstream of the second turbocharger compressor and upstream of the intake switching valve with a portion of the intake line upstream of the second turbocharger compressor and the first turbocharger compressor;

an intake bypass valve installed in the intake bypass conduit and adapted to open and close the intake bypass conduit; and means for opening the intake bypass valve at intake air quantities equal to or less than the second predetermined intake air quantity and closing the intake bypass valve at intake air quantities greater than the second predetermined intake air quantity.

11. An internal combustion engine with a dual turbocharger system according to claim 6, and further comprising:

an intake switching valve bypass conduit bypassing the intake switching valve; and a one-way valve installed in the intake switching valve bypass conduit and adapted to permit air to flow only from an upstream portion of the intake air switching valve to a downstream portion of the intake air switching valve.

* * * * *